(12) United States Patent
Brown (10) Patent No.: US 9,581,243 B2
(45) Date of Patent: Feb. 28, 2017

(54) EMERGENCY SACRIFICIAL SEALING METHOD IN FILTERS, EQUIPMENT, OR SYSTEMS

(71) Applicant: Lawrence Livermore National Security, LLC, Livewrmore, CA (US)

(72) Inventor: Erik P. Brown, Tracy, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 38 days.

(21) Appl. No.: 14/469,338

(22) Filed: Aug. 26, 2014

(65) Prior Publication Data

US 2014/0361491 A1   Dec. 11, 2014

Related U.S. Application Data

(62) Division of application No. 13/674,622, filed on Nov. 12, 2012, now Pat. No. 8,844,938.

(60) Provisional application No. 61/588,506, filed on Jan. 19, 2012.

(51) Int. Cl.
*F16J 15/00* (2006.01)
*F16J 15/06* (2006.01)

(52) U.S. Cl.
CPC ........... *F16J 15/008* (2013.01); *F16J 15/065* (2013.01)

(58) Field of Classification Search
CPC ........... F16J 15/38; F16J 15/403; F16J 15/453
USPC ............... 277/630, 637, 650, 931, 929, 934
See application file for complete search history.

(56) References Cited

U.S. PATENT DOCUMENTS

| | | | |
|---|---|---|---|
| 4,093,818 A * | 6/1978 | Thwaites | A62C 2/06 138/108 |
| 4,239,733 A | 12/1980 | Foster et al. | |
| 4,964,936 A * | 10/1990 | Ferro | B29C 67/2295 156/242 |
| 5,540,028 A * | 7/1996 | Scott | B01D 46/0005 52/302.1 |
| 5,686,039 A | 11/1997 | Merry | |
| 6,752,714 B1 | 6/2004 | Mann | |
| 8,029,345 B2 | 10/2011 | Messmer et al. | |
| 2008/0078841 A1* | 4/2008 | Messmer | A62C 2/065 236/49.3 |

FOREIGN PATENT DOCUMENTS

DE   2070997 A1 *  6/2009  ............ C09D 5/185
EP   2 412 409 A1    2/2012

* cited by examiner

*Primary Examiner* — Kristina Fulton
*Assistant Examiner* — L. Susmitha Koneru
(74) *Attorney, Agent, or Firm* — Eddie E. Scott (57) ABSTRACT

A system seals a filter or equipment component to abase and will continue to seal the filter or equipment component to the base in the event of hot air or fire. The system includes a first sealing material between the filter or equipment component and the base; and a second sealing material between the filter or equipment component and the base and proximate the first sealing material. The first sealing material and the second seal material are positioned relative to each other and relative to the filter or equipment component and the base to seal the filter or equipment component to the base and upon the event of fire the second sealing material will be activated and expand to continue to seal the filter or equipment component to the base in the event of hot air or fire.

6 Claims, 9 Drawing Sheets

EMERGENCY SACRIFICIAL SEALING METHOD IN FILTERS, EQUIPMENT, OR SYSTEMS

CROSS-REFERENCE TO RELATED APPLICATIONS

The present application is a Divisional of pending application Ser. No. 13/674,622 filed Nov. 12, 2012, which claims benefit under 35 U.S.C. §119(e) of U.S. Provisional Patent Application No. 61/588,506 filed Jan. 19, 2012, the disclosure of which is hereby incorporated by reference in its entirely for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to filters, equipment, or systems and more particularly to emergency sacrificial sealing method in filters, equipment, or systems.

State of Technology

European Patent Application No. EP 2 412 409 A1 for single-body intumescent gaskets for cold and hot smoke sealing, in particular for fire dampers published Jan. 2, 2010 provides the state of technology information reproduce below.

The present invention relates to intumescent gaskets for hot smoke and also cold smoke sealing, particularly suitable for fire dampers.

Fire dampers are used in the compartmentalisation of fire-fighting zones in ventilation and for air-conditioning systems and their purpose is to avoid the propagation of smoke in the air distribution channels during a fire by means of the closure of the respective blade mounted on said damper.

The closure of the blades generally takes place when a sensing member present thereon reaches the temperature of 72° C.: however the intumescent gaskets mounted on the blade or in the immediate vicinity thereof generally ensure good hot smoke sealing, generally at temperatures higher than 110° C., thanks to the expansion of the intumescent material, but are not suitable for lower temperature smoke sealing.

This is due to the fact that gaskets for fire dampers available to date on the market are formed in actual fact by two different gaskets adjacent one to the other and not integral, each one suitable for performing a different task: the first gasket is suitable for fire damping and hot smoke sealing which is made up of a band (A) in intumescent material having a minimum expansion temperature of 120-200° C., which can also be covered by a profile (B) in plastic, rigid or semi-rigid; the second gasket is suitable for cold smoke sealing which is made up, for example, of expanded polyurethane foam (C), The limits of this technical solution lie in having to use two different gaskets with different function to ensure the functioning of the entire system, and in having to attach the gasket (C), for example in polyurethane foam, close to the other gasket and to the blade by means of appropriate adhesives. Moreover, in the specific case of profiles for intumescents in rigid plastic, for example those for containing intumescent calcium silicates, their elastic and sealing performances are limited due to the reduced adaptability to curvilinear shapes.

To overcome this problem of elasticity and of sealing attempts were made to incorporate the intumescent material, in general intumescent graphite, in a PVC matrix so as to generate a composite suitable for being extruded in flexible tubular form: however the incorporation of intumescent material in a polymeric matrix such as PVC results in a smaller expansion of the intumescent material at the time of use since it expands partially already during the incorporation and/or crosslinking of the tubular article, and therefore with lower the damping performances. Moreover the obtaining of flexible gaskets with smooth surface from said extrudable matrices is difficult and their combustion generates toxic fumes such as hydrochloric acid.

Profiles in plastic are not known to date which are flexible and which contain intumescent material able both to seal against cold smoke and to expand completely during the fire.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides the use and application of materials (e.g., sealant(s), paints, coatings, chemicals or metals) in filters and other equipment (e.g., units in ductwork or high temperature systems or systems that may be exposed to high temperatures or come in contact with flame environments, including process gas systems or ventilation systems) individually or in conjunction with mechanical seals for sacrificial, emergency-sealing of equipment components.

In various embodiments the present invention uses intumescent materials, organic, inorganic compounds, metals (e.g. Polymerization with $SiO_2$) to react and expand upon exposure to high heat or fire. The expanding materials either displace and replace the normal operational seals or backs up (back fills, supports, metal deforms/crimps to make a seal to continue the function of) the normal operational seal as it burns away. The expanded materials are heat, fire proof or fire resistant. The expanded material solidifies and maintains a seal (e.g. welding the parts together), or expands and slowly burns away in a controlled predictable manner. The expanding material may also force locking pins, bars or hooks to engage locking the parts together.

In one embodiment the present invention provides an apparatus that seals a filter or equipment component to a base and will continue to seal the filter or equipment component to the base in the event of hot air or fire. The apparatus includes a seal material between the filter or equipment component and the base; and an intumescent material between the filter or equipment component and the base and proximate the seal material. The intumescent material and the seal material are positioned relative to each other and relative to the filter or equipment component and the base to seal the filter or equipment component to the base. Upon the event of fire said intumescent material will be activated and will expand to continue to seal the filter or equipment component to the base in the event of hot air or fire. In another embodiment the present invention provides a method of sealing a filter or equipment component to a base and will continuing to seal the filter or equipment component to the base in the event of hot air or fire. The method includes the steps of positioning a seal material between the filter or equipment component and the base to provide a seal of the filter or equipment component to the base. An intumescent material is positioned between the filter or equipment component and the base and proximate the seal material. The intumescent material and the seal material are positioned relative to each other and relative to the filter or equipment component and the base to seal the filter or equipment component to the base. Upon the event of fire the intumescent material will be activated and expand to continue to seal the filter or equipment component to the base.

The present invention has uses for the protection of equipment components from spread of fire, air and/or fluid flow leakage, or separation in the event of unexpected high temperatures or flames. In emergency situations the present invention will, through heat activation, destructively deform with or without other mechanical devices to maintain system integrity and confinement. One example is in the event of hot air or fire entering an air duct, this invention will be activated and destructively displace the normal operational seal. The present invention has uses for data repositories, fire proof safes, munitions storage, and other instances where protection from heat and fire.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

A Defense Nuclear Facility Safety Board (DNFSB) study found that conventional glass fiber HEPA filters are structurally weak and easily damaged by water or fires. Many HEPA filter units are constructed of wooden or stainless steel frames containing a fluted sheet of fiberglass. During the event of a fire the hot air generated causes the filter media to become dry and brittle, thus reducing its effectiveness. Also, the wooden frames as well as the filter media are threatened by consumption by the fire itself. The conventional HEPA filter media's effectiveness is also compromised by high humidity. The additional moisture causes the filter media to become weakened allowing it to become susceptible to tearing easily, causing breakthrough. (DNFSB, 1999)

The present invention provides a system that seals a filter or equipment component to a base and will continue to seal the filter or equipment component to the base in the event of hot air or fire. The system includes a seal material between the filter or equipment component and the base and a material containing an initiator between the filter or equipment component and the base and proximate said seal material. The material containing an initiator and the seal material are positioned relative to each other and relative to the filter or equipment component and the base to seal the filter or equipment component. Upon the event of fire said imitator in said material containing an initiator will be activated and said material containing an initiator will expand to continue to seal the filter to the base in the event of hot air or fire.

The present invention is further described and illustrated by a number of examples of system constructed in accordance with the present invention. Various changes and modifications of these examples will be apparent to those skilled in the art from the description of the examples and by practice of the invention. The scope of the invention is not intended to be limited to the particular examples disclosed and the invention covers all modifications, equivalents, and alternatives falling within the spirit and scope of the invention as defined by the claims.

Example 1

Intumescent Material

Figure 1A:
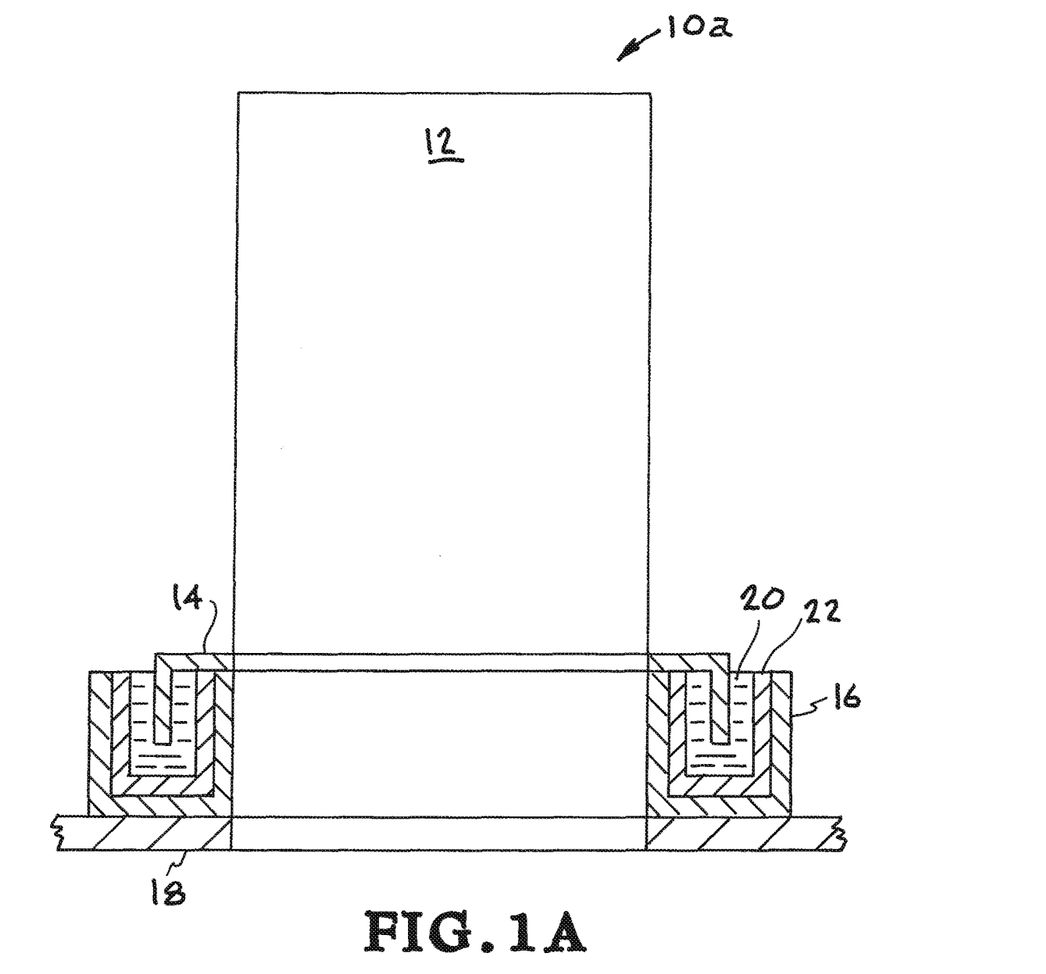
FIGS. 1A, 1B, and 1C illustrate one embodiment of the present invention wherein an apparatus and method seals a filter to a base and will continue to seal the filter to the base in the event of hot air or fire.
Figure 1B:
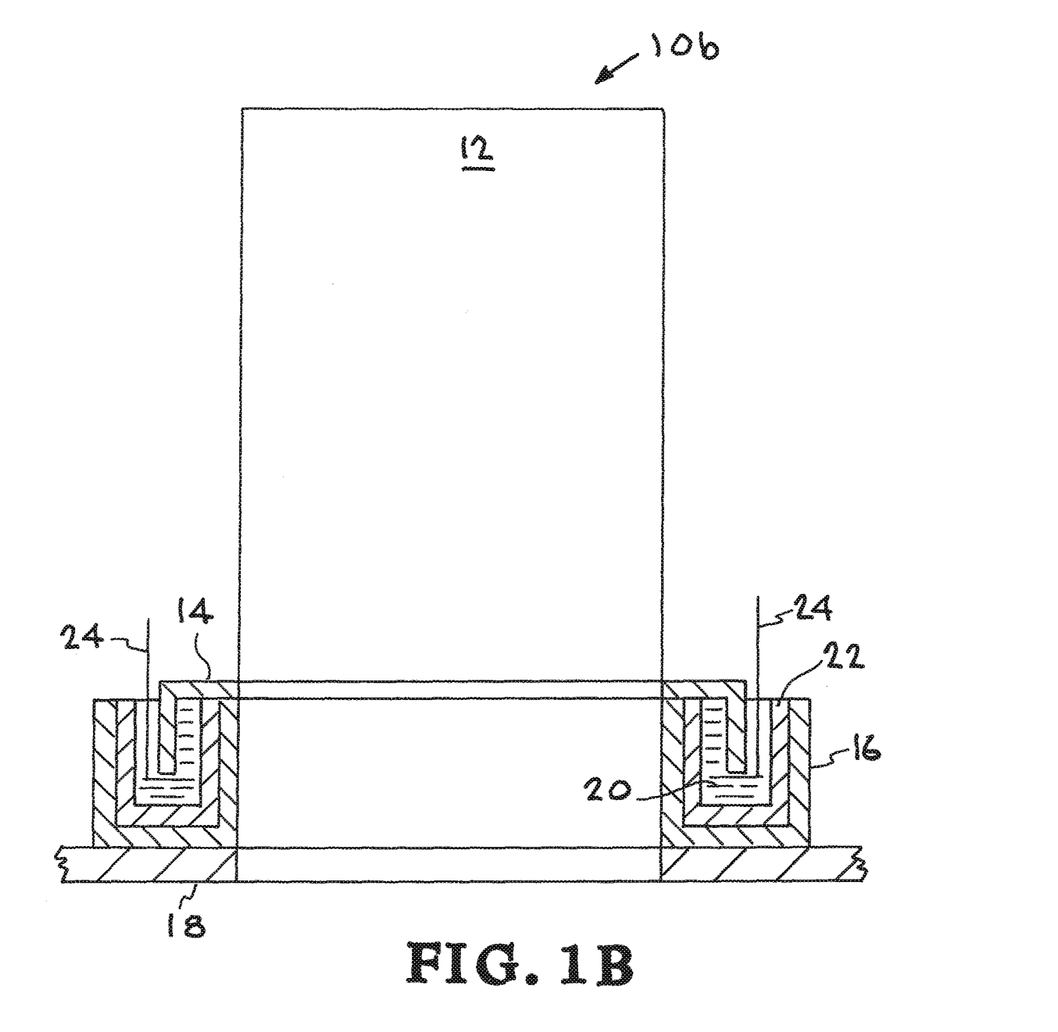
Figure 1C:
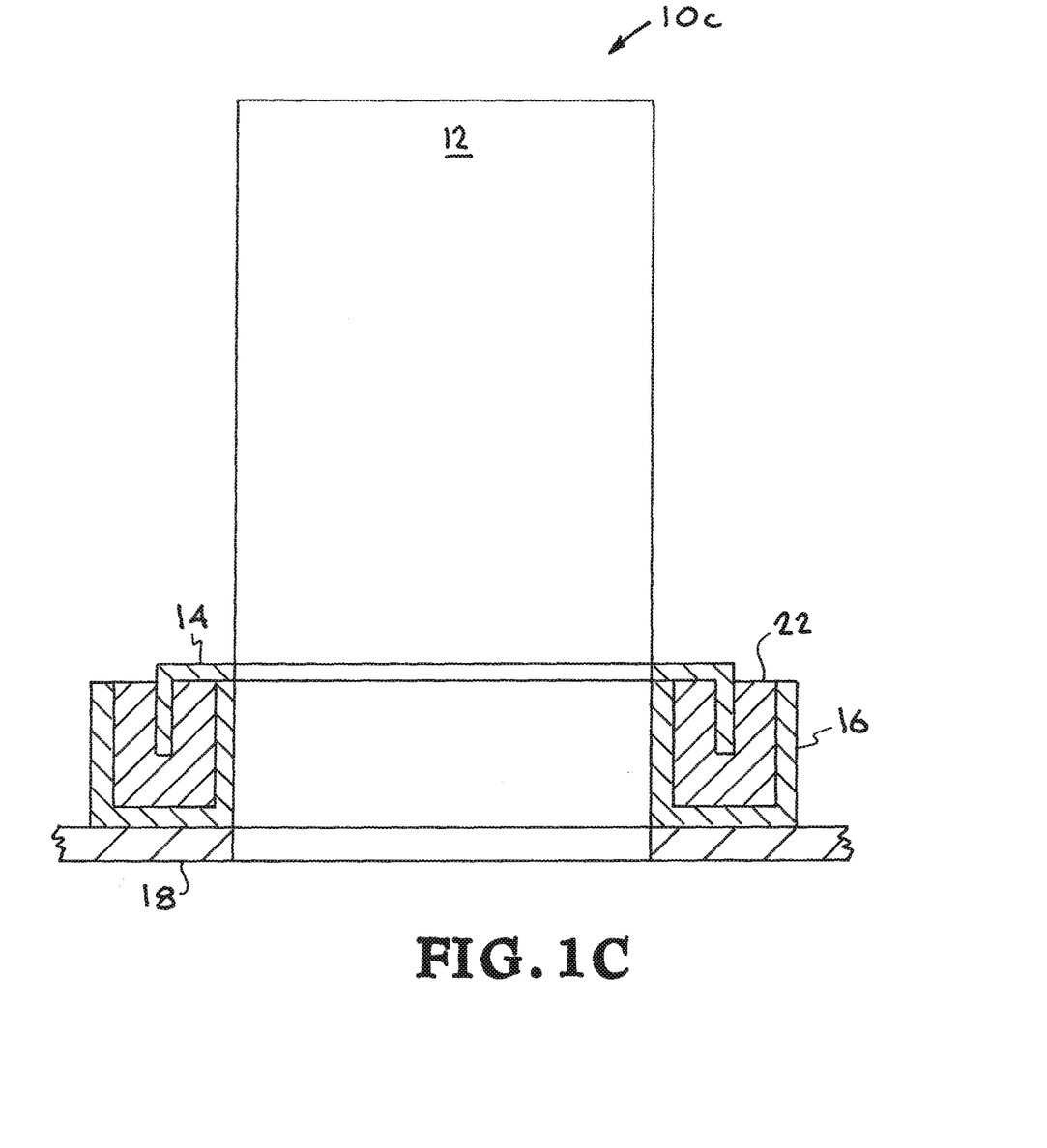

Referring now to the drawings and in particular to FIGS. 1A, 1B, and 1C; an example of one embodiment of an emergency sacrificial sealing system in filters constructed in accordance with the present invention is illustrated. The emergency sacrificial sealing system in filters is designated generally by the reference numerals 10*a* in FIG. 1A, 10*b* in FIG. 1B, and 10*c* in FIG. 1C. The system includes a tubular filter element 12. The tubular filter element 12 is positioned over a hole in the base or support plate 18. The tubular filter element 12 is closed at the top. This causes flow of the fluid being filter to pass from the outside of the tubular filter element 12 through the sides of the tubular filter element 12 into the internal passage of the tubular filter element 12. The tubular filter element 12 is made of filtering material or a filtering material is on the tubular filter element and the fluid is filtered as it passes through the sides of the tubular filter element 12 into the internal passage of the tubular filter element. The tubular filter element 12 is open at the bottom to allow fluid flow from the internal passage of the tubular filter element 12 out the bottom open end of the tubular filter element 12.

The filter element 12 is positioned over a hole in the base or support plate 18. The filter element 12 is sealed to the base or support plate 18 by frame 14, jell seal 20, and intumescent material 22. The intumescent material 22 is a material that undergoes a chemical change when exposed to heat or flames, becoming viscous then forming expanding bubbles that harden into a dense, heat insulating multi-cellular char. This expanding char can seal, insulate, and protect mating surfaces and joints, helping to prevent warping, subsequent leakage and damage.

The emergency sacrificial sealing system 10a, 10b, and 10c is an apparatus that seals a filter to a base and will continue to seal the filter to the base in the event of hot air or fire. The apparatus includes a seal material between the filter and the base, and an intumescent material between the filter and the base and proximate said seal material. The intumescent material and said the material are positioned relative to each other and relative to the filter and the base to seal the filter to the base. Upon the event of fire the intumescent material will be activated and expand to continue to seal the filter to the base.

Referring now to FIGS. 1B and 1C; the sealing of the filter element 12 to the base or support plate 18 is illustrated. In the event of hot air or fire entering the filter 12, the emergency sacrificial sealing system will be activated and destructively displace the normal operational seal 20. The emergency sacrificial sealing system will be activated and seal unit 22, intumescent materials, organic, inorganic compounds, metals (e.g. Polymerization with SiO2) will react and expand upon exposure to high heat or fire. The expanding materials 22 either displace or replace the normal operational seal 20 or backs up (back fills, supports, metal deforms/crimps to make a seal to continue the function of) the normal operational seal 20 as it burns away. The expanded materials 22 are heat, fire proof or fire resistant. The expanded material 22 solidifies and maintains a seal (e.g. welding the parts together), or expands and slowly burns away in a controlled predictable manner.

As shown in FIG. 1B the event of hot air or fire entering the filter 12, as illustrated by the arrow 24, has caused a portion of the gel seal 20 to burn away or evaporate. As shown in FIG. 10 the hot air or fire has caused the entire gel seal 20 to burn away or evaporate. The intumescent material 22 has expanded and filled the space left by the gel seal 20. The intumescent material 22 is a material that undergoes a chemical change when exposed to heat or flames, becoming viscous then forming expanding bubbles that harden into a dense, heat insulating multi-cellular char. This expanding char can seal, insulate, and protect mating surfaces and joints, helping to prevent warping, subsequent leakage and damage. The intumescent material may also be compliant allowing for differential thermal expansion between the filter and supporting structure.

The intumescent material 22 has undergone a chemical change after being exposed to heat or flames and has become viscous forming expanding bubbles that harden into a dense, heat insulating multi-cellular char. This expanding char will seal, insulate, and protect mating surfaces and joints, helping to prevent warping, subsequent leakage and damage. The intumescent material 22 may also be compliant allowing for differential thermal expansion between the filter and supporting structure.

The emergency sacrificial sealing system 10a, 10b, and 10c provides a method of sealing a filter to a base that will continuing to seal the filter to the base in the event of hot air or fire. The method includes the steps of positioning a seal material between the filter and the base to provide a seal to the base and positioning an intumescent material between the filter and the base and proximate said seal material. The intumescent material and the seal material are positioned relative to each other and relative to the filter and the base to seal the filter to the base and upon the event of fire the intumescent material will be activated and expand to continue to seal the filter to the base.

Example 2

Deformable Member

Figure 2A:
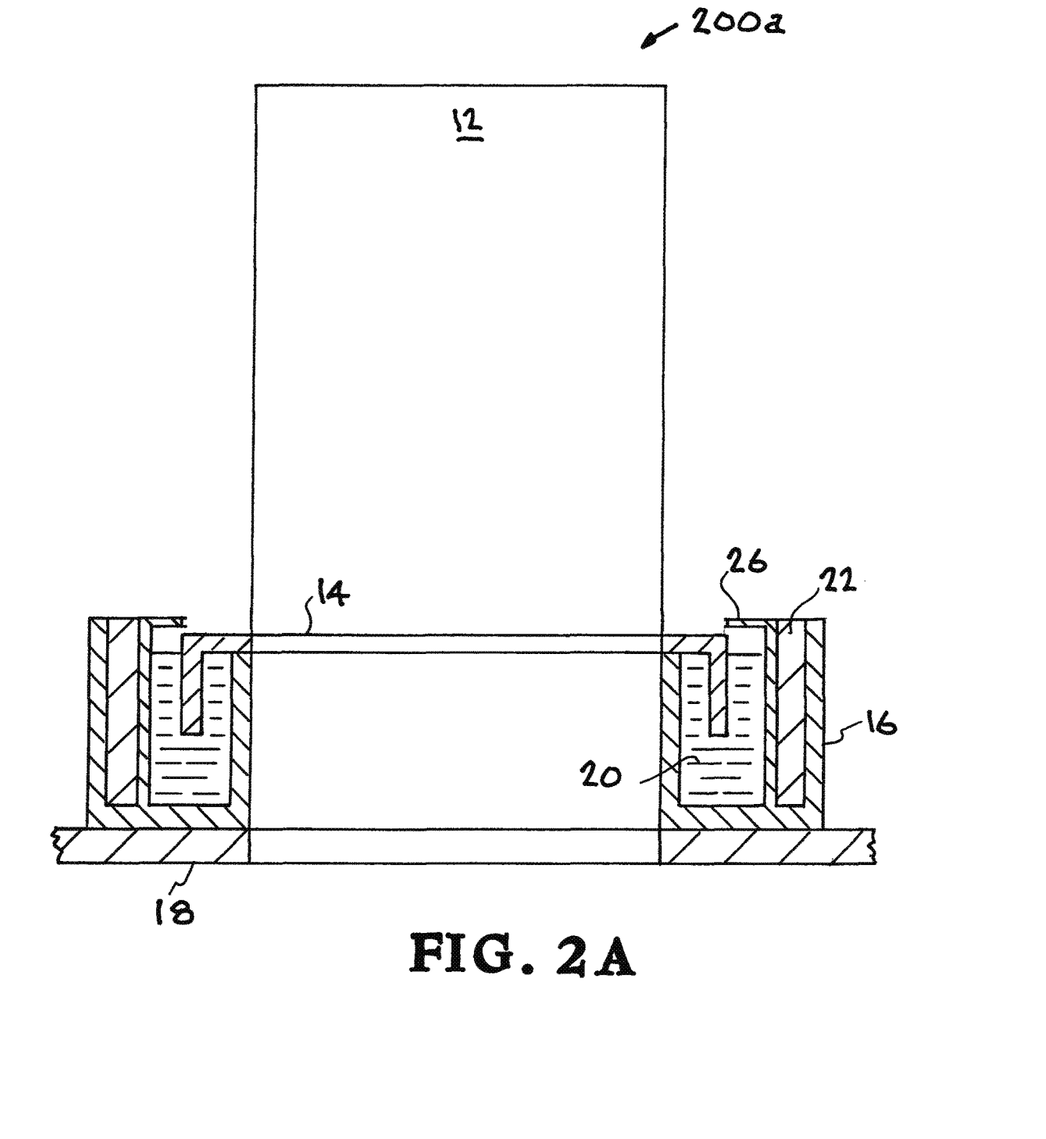
FIGS. 2A and 2B illustrate another embodiment of the present invention wherein an apparatus and method seals a filter to a base and will continue to seal the filter to the base in the event of hot air or fire.
Figure 2B:
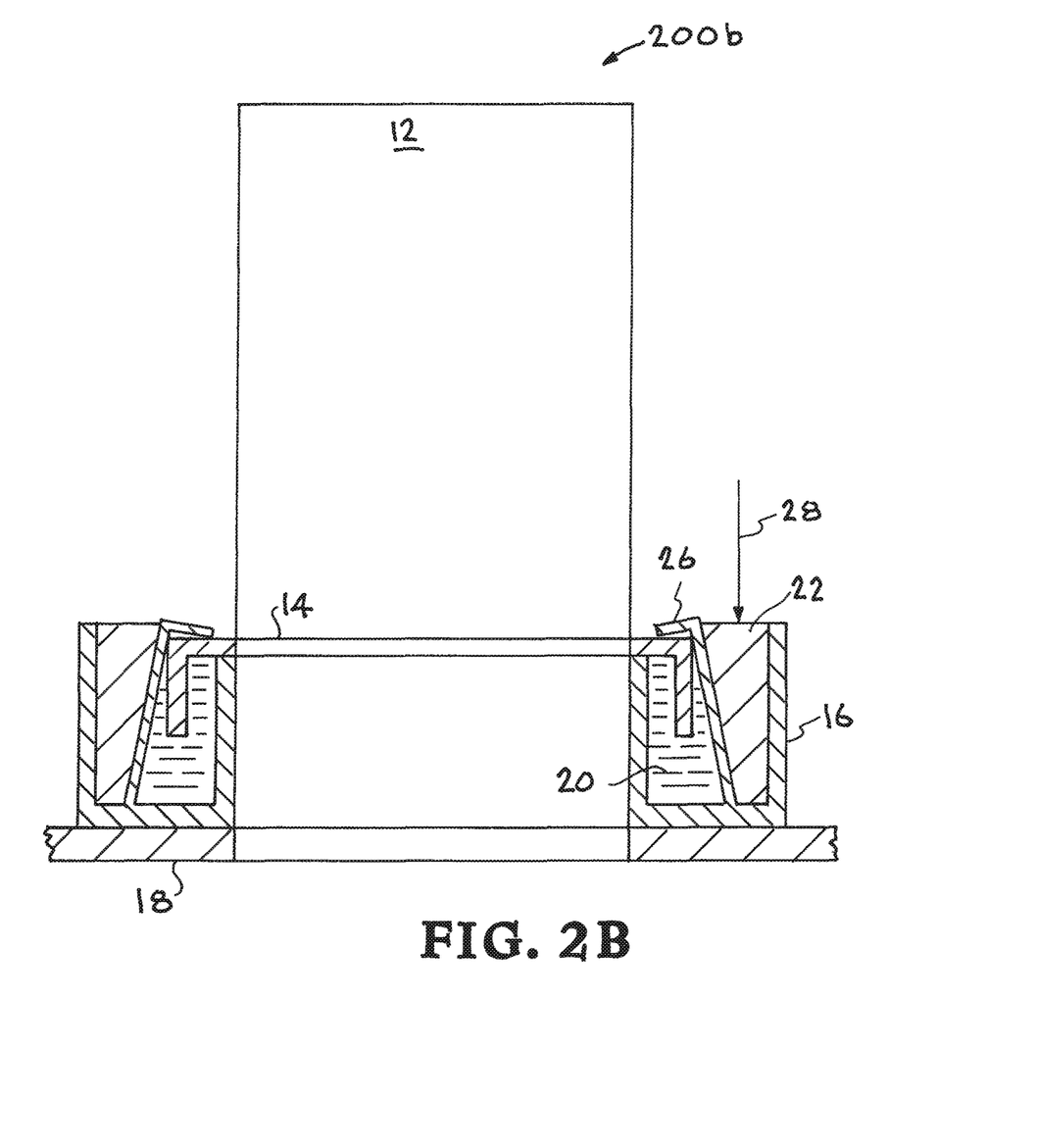

Referring now FIGS. 2A and 2B; an example of another embodiment of an emergency sacrificial sealing system in filters constructed in accordance with the present invention is illustrated. The emergency sacrificial sealing system in filters is designated generally by the reference numerals 200a in FIG. 2A and 200b in FIG. 2B. The system includes a tubular filter element 12. The tubular filter element 12 is positioned over a hole in the base or support plate 18. The tabular filter element 12 is closed at the top. This causes flow of the fluid being filter to pass from the outside of the tubular filter element 12 through the sides of the tubular filter element 12 into the internal passage of the tubular filter element 12. The tubular filter element 12 is made of filtering material or a filtering material is on the tubular filter element and the fluid is filtered as it passes through the sides of the tubular filter element 12 into the internal passage of the tubular filter element. The tubular filter element 12 is open at the bottom to allow fluid flow from the internal passage of the tubular filter element 12 out the bottom open end of the tubular filter element 12.

The filter element 12 is positioned over a hole in the base or support plate 18. The filter element 12 is sealed to the base or support plate 18 by frame 14, jell seal 20, and intumescent material 22. The intumescent material 22 is a material that undergoes a chemical change when exposed to heat or flames, becoming viscous then forming expanding bubbles that harden into a dense, heat insulating multi-cellular char. This expanding char can seal, insulate, and protect mating surfaces and joints, helping to prevent warping, subsequent leakage and damage. A deformable member 26 is positioned between the jell seal 20 and the intumescent material 22. The deformable member 26 is positioned to move to lock upon the frame 14.

The emergency sacrificial sealing system 200a and 200bc is an apparatus that seals a filter to a base and will continue to seal the filter to the base in the event of hot air or fire. The apparatus includes a seal material between the filter and the base, and an intumescent material between the filter and the base and proximate said seal material. The deformable member 26 is positioned between the jell seal 20 and the intumescent material 22. The intumescent material and said the material are positioned relative to each other and relative to the filter and the base to seal the filter to the base. Upon the event of fire the intumescent material will be activated and expand to continue to seal the filter to the base and the deformable member 26 will move to lock upon the frame 14. The deformable member 26 shields the jell seal 20 from the fire and from heat.

Referring again to FIGS. 200A and 200B; the sealing of the filter element 12 to the base or support plate 18 is illustrated. In the event of hot air or fire entering the filter 12, the emergency sacrificial sealing system will be activated and destructively displace the normal operational seal 20 and the deformable member 26 will move to lock upon the frame 14. The emergency sacrificial sealing system will be activated and seal unit 22, intumescent materials, organic, inorganic compounds, metals (e.g. Polymerization with SiO2) will react and expand upon exposure to high heat or fire. The expanding materials 22 either displace or replace the normal operational seal 20 or backs up (back fills, supports, metal deforms/crimps to make a seal to continue the function of) the normal operational seal 20 as it burns away. The expanded materials 22 are heat, fire proof or fire resistant. The expanded material 22 solidifies and maintains a seal (e.g. welding the parts together), or expands and slowly burns away in a controlled predictable manner.

As shown in FIG. 200B; the event of hot air or fire entering the filter 12, as illustrated by the arrow 28, will cause the intumescent material 22 to expand and to move the deformable member 26 to a position where it is locked upon the frame 14. The expansion of the intumescent material 22 displaces some of the gel seal material 20 and fills the space left by the evaporation or burning of gel seal 20. The intumescent material 22 is a material that undergoes a chemical change when exposed to heat or flames, becoming viscous then forming expanding bubbles that harden into a dense, heat insulating multi-cellular char. This expanding char can seal, insulate, and protect mating surfaces and joints, helping to prevent warping, subsequent leakage and damage. The intumescent material may also be compliant allowing for differential thermal expansion between the filter and supporting structure.

The emergency sacrificial sealing system 200a and 200b provides a method of sealing a filter to a base that will continuing to seal the filter to the base in the event of hot air or fire and lock the filter to the base. The method includes the steps of positioning a seal material between the filter and the base to provide a seal to the base. An intumescent material is positioned between the filter and the base and proximate said seal material. A deformable material is positioned between the intumescent material and the seal material. The intumescent material, the deformable member, and the seal material are positioned relative to each other and relative to the filter and the base to seal the filter to the base. Upon the event of fire the intumescent material will be activated and expand and move the deformable member to lock the filter to the base. The deformable member 26 shields the jell seal 20 from the fire and from heat. The emergency sacrificial sealing system 200a and 200b will continue to seal the filter to the base.

Example 3

Exothermically Expandable Material

Figure 3A:
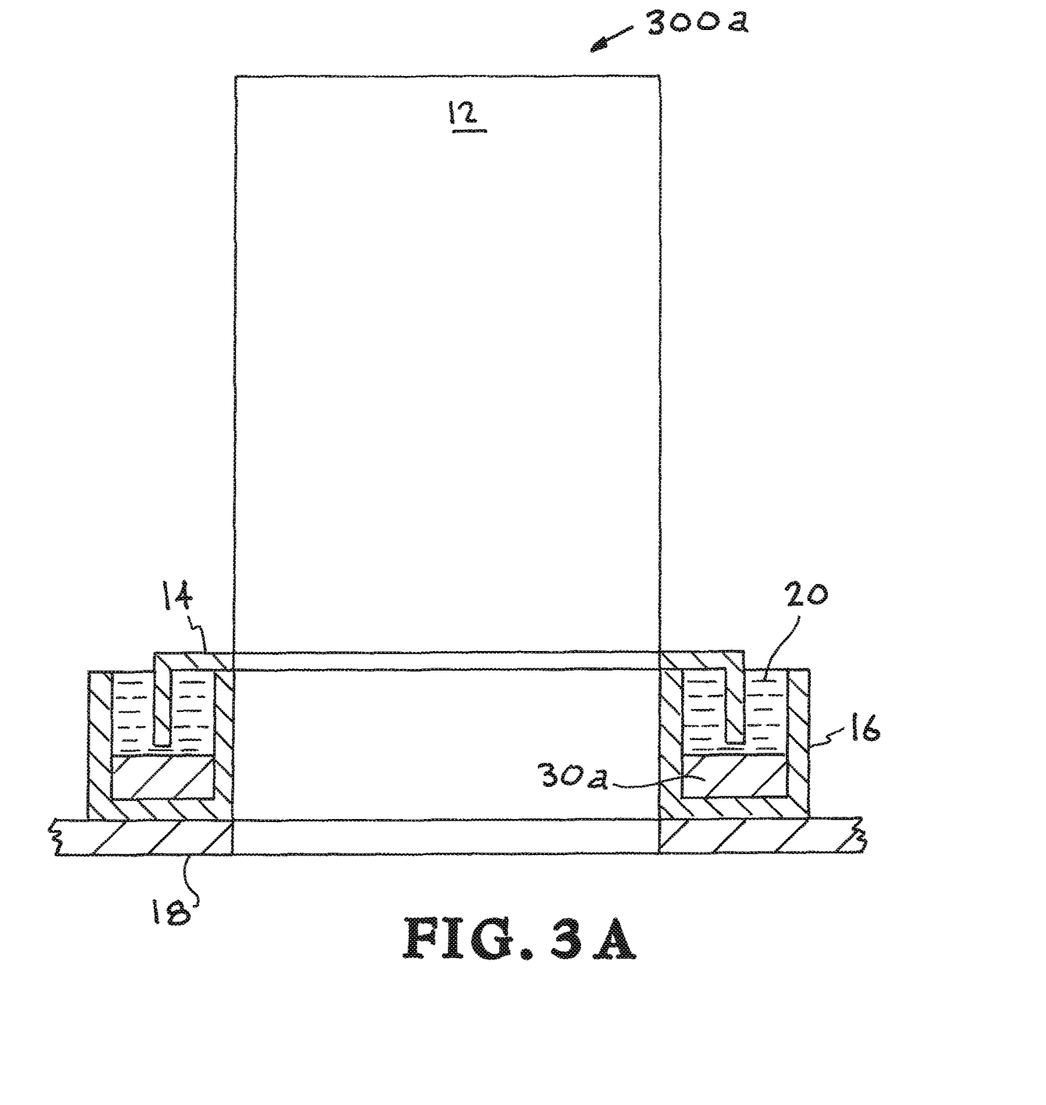
FIGS. 3A and 3B illustrate yet another embodiment of the present invention wherein an apparatus and method seals a filter to a base and will continue to seal the filter to the base in the event of hot air or fire.
Figure 3B:
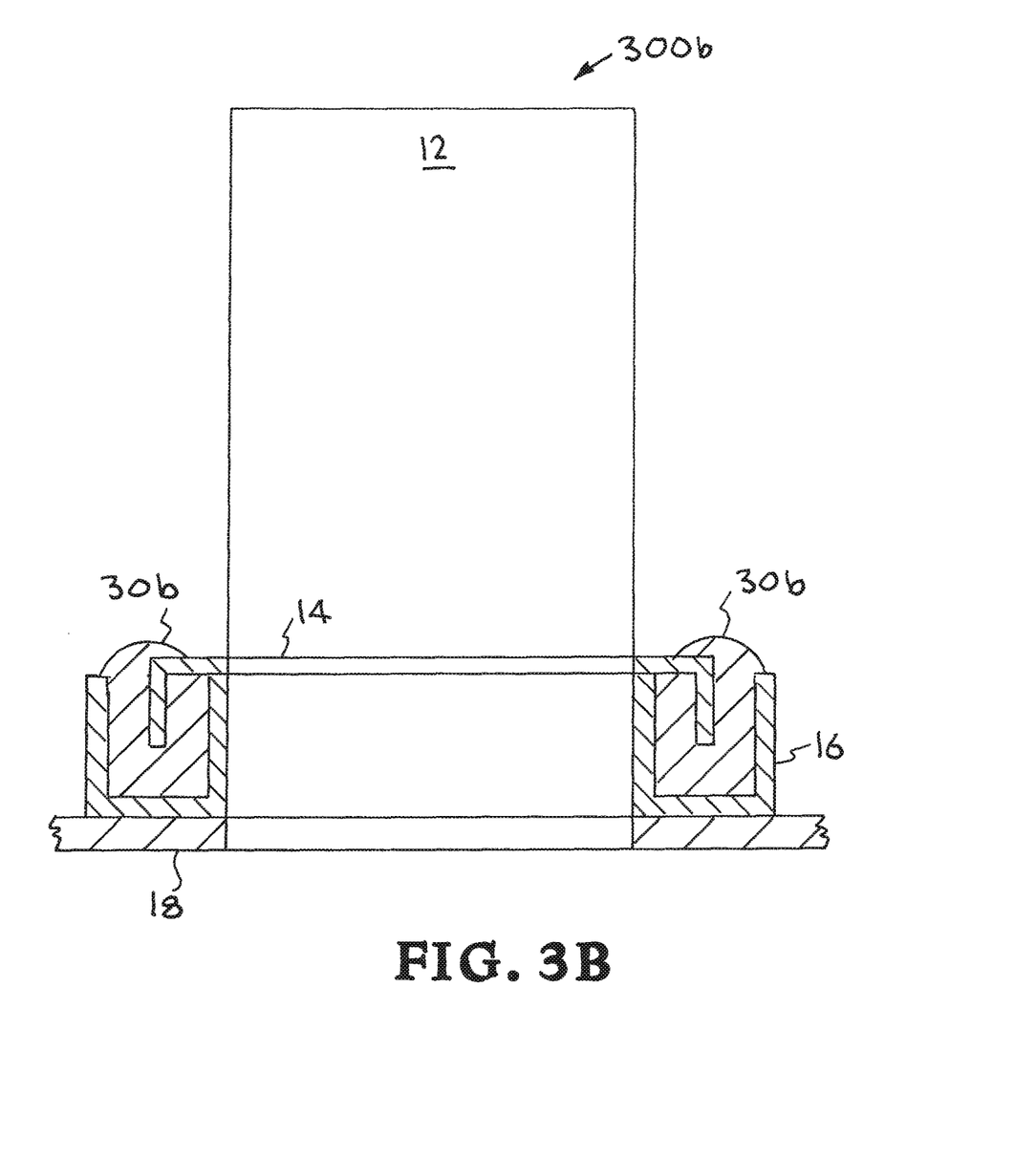

Referring now FIGS. 3A and 3B; another example of an embodiment of an emergency sacrificial sealing system in filters constructed in accordance with the present invention is illustrated. The emergency sacrificial sealing system in filters is designated generally by the reference numerals 300a in FIG. 3A and 300b in FIG. 3B. The system includes a tubular filter element 12. The tubular filter element 12 is positioned over a hole in the base or support plate 18. The tubular filter element 12 is closed at the top. This causes flow of the fluid being filter to pass from the outside of the tubular filter element 12 through the sides of the tubular filter element 12 into the internal passage of the tubular filter element 12. The tubular filter element 12 is made of filtering material or a filtering material is on the tubular filter element and the fluid is filtered as it passes through the sides of the tubular filter element 12 into the internal passage of the tubular filter element. The tubular filter element 12 is open at the bottom to allow fluid flow from the internal passage of the tubular filter element 12 out the bottom open end of the tubular filter element 12.

The filter element 12 is positioned over a hole in the base or support plate 18. The filter element 12 is sealed to the base or support plate 18 by frame 14, jell seal 20, and organic/inorganic material 300a/300b that will expand exothermically when exposed to heat and harden. The organic/inorganic material that will expand exothermically when exposed to heat and harden 300a/300b is a material that undergoes a chemical change when exposed to heat or flames.

The emergency sacrificial sealing system 300a and 300bc is an apparatus that seals a filter to a base and will continue to seal the filter to the base in the event of hot air or fire. The apparatus includes a seal material between the filter and the base, and an organic/inorganic material that will expand exothermically when exposed to heat and harden between the filter and the base and proximate said seal material. The deformable member 26 is positioned between the jell seal 20 and the organic/inorganic material 300a/300b that will expand exothermically when exposed to heat and harden. The organic/inorganic material that will expand exothermically when exposed to heat and harden are positioned relative to each other and relative to the filter and the base to seal the filter to the base. Upon the event of fire the organic/inorganic material that will expand exothermically when exposed to heat and harden will be activated and expand to continue to seal the filter to the base.

Referring again to FIGS. 300A and 300B; the sealing of the filter element 12 to the base or support plate 18 is illustrated. In the event of hot air or fire entering the filter 12, the emergency sacrificial sealing system will be activated and destructively displace the normal operational seal 20. The emergency sacrificial sealing system will be activated and seal unit 300a/300b organic/inorganic material will expand exothermically when exposed to heat and harden. The expanding material 300a/300b is heat, fire proof or fire resistant. The expanded material 300a/300b solidifies and maintains a seal (e.g. welding the parts together).

As shown in FIG. 300B; the event of hot air or fire will cause the organic/inorganic material 300a/300b that will expand exothermically when exposed to heat and harden to expand. The expansion of the organic/inorganic material 300a/300b expands exothermically and hardens displacing the gel seal material 20 and fills the space left by gel seal 20. The organic/inorganic material 300a/300b undergoes a chemical change when exposed to heat or flames.

The emergency sacrificial sealing system 300a and 300b provides a method of sealing a filter to a base that will continuing to seal the filter to the base in the event of hot air or fire and lock the filter to the base. The method includes the steps of positioning a seal material between the filter and the base to provide a seal to the base. An organic/inorganic material that will expand exothermically when exposed to heat and harden is positioned between the filter and the base and proximate said seal material. The organic/inorganic material that will expand exothermically when exposed to heat and harden and the seal material are positioned relative to each other and relative to the filter and the base to seal the filter to the base. Upon the event of fire the organic/inorganic material will expand exothermically and expand until it replaces the gel seal 20. The emergency sacrificial sealing system 300*a* and 300*b* will continue to seal the filter to the base.

Example 4

Material Containing an Initiator

Figure 4A:
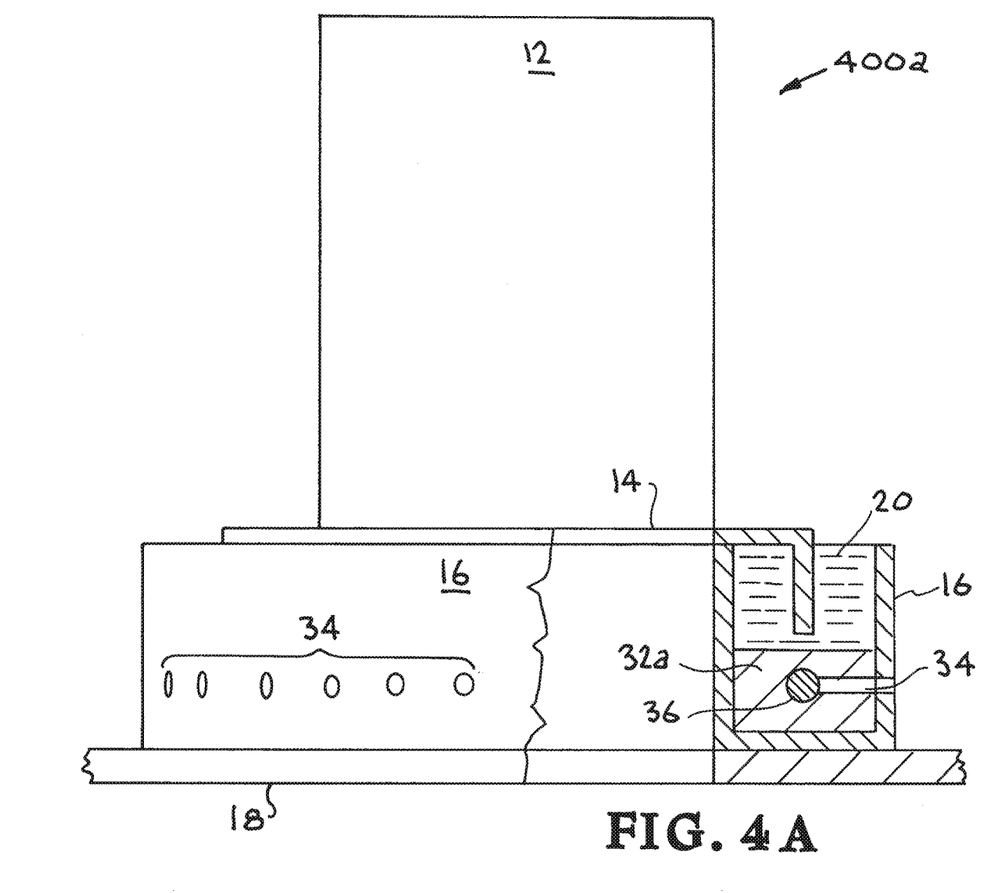
FIGS. 4A and 4B illustrate an embodiment of the present invention wherein an apparatus and method seals a filter to a base and will continue to seal the filter to the base in the event of hot air or fire.
Figure 4B:
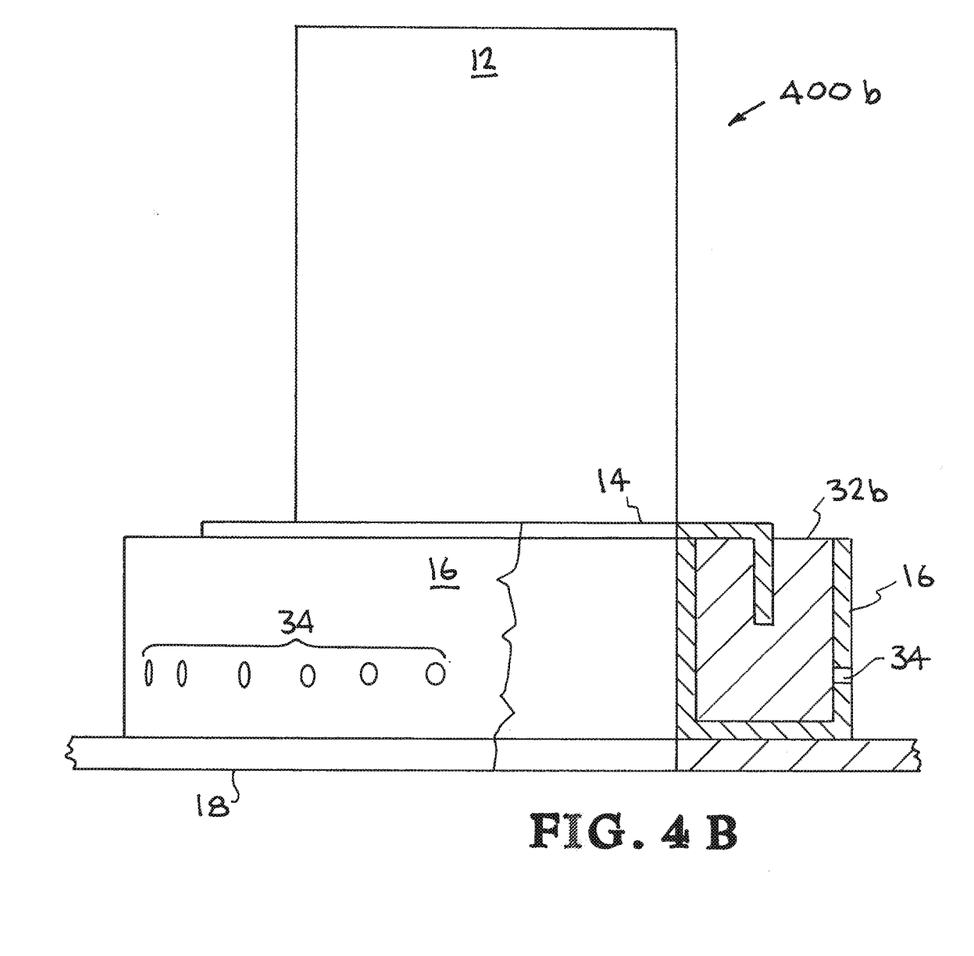

Referring now FIGS. 4A and 4B another example of an embodiment of an emergency sacrificial sealing system in filters constructed in accordance with the present invention is illustrated. This embodiment of an emergency sacrificial sealing system in filters is designated generally by the reference numerals 400*a* in FIG. 4A and 400*b* in FIG. 4B. The system includes a tubular filter element 12. The tubular filter element 12 is positioned over a hole in the base or support plate 18. The tubular filter element 12 is closed at the top. This causes flow of the fluid being filter to pass from the outside of the tubular filter element 12 through the sides of the tubular filter element 12 into the internal passage of the tubular filter element 12. The tubular filter element 12 is made of filtering material or a filtering material is on the tubular filter element and the fluid is filtered as it passes through the sides of the tubular filter element 12 into the internal passage of the tubular filter element. The tubular filter element 12 is open at the bottom to allow fluid flow from the internal passage of the tubular filter element 12 out the bottom open end of the tubular filter element 12.

The filter element 12 is positioned over a hole in the base or support plate 18. The filter element 12 is sealed to the base or support plate 18 by frame 14, jel seal 20, and material 400*a*/400*b* containing an initiator. The material 400*a*/400*b* containing an initiator is a material 32*a* that will expand when exposed to heat and will harden. The material 32*a* contains an initiator 36 within the material 32. The initiator 36 is located within holes 34 in the material 32*a*. The initiator 36 can be thermite or other type of initiator. When exposed to heat caused by a fire the initiator 36 will ignite and cause the material 32*a* to expand and replace the gel seal 20. The gel seal is also evaporated or burned by the heat from the fire. The material 32*a* will solidify to fuse and seal the filter and frame.

The emergency sacrificial sealing system 400*a* and 400*bc* is an apparatus that seals a filter to a base and will continue to seal the filter to the base in the event of hot air or fire. The apparatus includes a seal material between the filter and the base, and a material 400*a*/400*b* containing an initiator that will expand. The material containing an initiator and the seal material are positioned relative to each other and relative to the filter and the base to seal the filter and upon the event of fire said imitator in said material containing an initiator will be activated and the material containing an initiator will expand to continue to seal the filter to the base in the event of hot air or fire.

As shown in FIG. 400B; the event of hot air or fire will cause the material 400*a*/400*b* containing an initiator to fill the space left by gel seal 20. The emergency sacrificial sealing system 400*a* and 400*b* provides a method of sealing a filter to a base that will continuing to seal the filter to the base in the event of hot air or fire. The method includes the steps of positioning a seal material between the filter and the base to provide a seal to the base. The material containing an initiator that will expand when exposed to heat and will harden is positioned between the filter and the base and proximate said seal material.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An emergency sacrificial sealing method of sealing that will continuing to seal in the event of hot air or fire, comprising the steps of:
    providing a filter;
    providing a base;
    providing said filter with a tubular filter element having an internal passage, a closed top, and an open bottom;
    providing said base with a base plate;
    providing a hole in said base plate;
    positioning said tubular filter element over said base plate directly connected to said base plate with said open bottom of said tubular filter element over said hole in said base;
    positioning a first seal material between said tubular filter element and said base plate to provide a seal of said tubular filter element to said base plate wherein said first seal material is a gel seal material;
    providing a second seal material that is a material that will expand when exposed to heat and will harden; and
    positioning said second seal material between said tubular filter element and said base plate and proximate said first seal material, wherein said first seal material and said second seal material are positioned relative to each other and relative to said tubular filter element and said base plate to seal said tubular filter element to said base plate; and upon the event of hot air or fire said second seal material will be activated and expand to continue to seal said tubular filter element to said base in the event of hot air or fire.

2. The emergency sacrificial sealing method of sealing that will continuing to seal in the event of hot air or fire of claim 1 wherein said second sealing material is a material containing an initiator positioned between said tubular filter element and said base plate and proximate said first seal material, wherein said material containing an initiator and said first seal material are positioned relative to each other and relative to said tubular filter element and said base plate to seal said tubular filter element to said base plate and upon the event of hot air or fire, said material containing an initiator will be activated and expand to continue to seal said tubular filter element to said base plate in the event of hot air or fire.

3. An emergency sacrificial sealing apparatus that seals and will continue to seal in the event of hot air or fire, comprising:
    a filter and
    a base;
    said filter including
       a tubular filter element having an internal passage, a closed top, and an open bottom;
    said base including
       a base plate;
       a hole in said base plate;

wherein said tubular filter element is positioned over said base plate and directly connected to said base plate and wherein said open bottom of said tubular filter element is positioned over said hole in said base plate;

a first sealing material between said tubular filter element and said base plate; and a second sealing material between said tubular filter element and said base plate and proximate said first sealing material, wherein said first sealing material and said second seal material are positioned relative to each other and relative to said tubular filter element and upon the event of fire said second sealing material will be activated and expand to continue to seal said tubular filter element to said base plate in the event of hot air or fire; and wherein said second sealing material is a material that will expand when exposed to heat and will harden that is positioned between said tubular filter element and said base plate and proximate said first sealing material, wherein said material that will expand when exposed to heat and will harden and wherein said first sealing material and said second sealing material are positioned relative to each other and relative to said tubular filter element and said base plate to seal said tubular filter element to said base plate and upon the event of fire said second material will expand when exposed to heat and will harden and will be activated and expand to continue to seal said tubular filter element to said base plate in the event of hot air or fire.

4. An emergency sacrificial sealing apparatus that will seal and will continue to seal in the event of hot air or fire, comprising:

a tubular filter element, said tubular filter element having an internal passage, a closed top, and an open bottom;

a base plate;

a hole in said base plate wherein said tubular filter element is positioned over said base plate and directly connected to said base plate with said open bottom of said tubular filter element positioned over said hole in said base plate;

a first sealing material between said tubular filter element and said base plate; and a second sealing material between said tubular filter element and said base plate and proximate said first sealing material, wherein said first sealing material and said second seal material are positioned relative to each other and relative to said tubular filter element and said base plate to seal said tubular filter element to said base plate and upon the event of fire said second sealing material will be activated and expand to continue to seal said tubular filter element to said base plate in the event of hot air or fire; and wherein said second sealing material is a material containing an initiator positioned between said tubular filter element and said base plate and proximate said first sealing material, wherein said material containing an initiator and said first sealing material are positioned relative to each other and relative to said tubular filter and said base plate to seal said tubular filter to said base plate and upon the event of hot air or fire said material containing an initiator will be activated and expand to continue to seal said tubular filter element to said base plate in the event of hot air or fire.

5. An emergency sacrificial sealing apparatus that seals a filter to a base and will continue to seal the filter to the base in the event of hot air or fire, comprising:

a filter and a base;

said filter including a tubular filter element having an internal passage, a closed top, and an open bottom;

said base including a base plate;

a hole in said base plate;

wherein said tubular filter element is positioned over said base plate and directly connected to said base plate and wherein said open bottom of said tubular filter element is positioned over said hole in said base plate;

a first sealing material between said tubular filter element and said base plate wherein said first sealing material is a gel seal; and a second sealing material between said tubular filter element and said base plate and proximate said first sealing material, wherein said first sealing material and said second seal material are positioned relative to each other and relative to said tubular filter element and said base plate to seal said tubular filter element to said base plate and upon the event of hot air or fire said second sealing material will be activated and expand to continue to seal said tubular filter element to the base in the event of hot air or fire;

wherein said second sealing material is a material that will expand when exposed to heat and will harden that is positioned between said tubular filter element and said base plate and proximate said first sealing material, wherein said material that will expand when exposed to heat and will harden and said first sealing material are positioned relative to each other and relative to the and said base plate to seal said tubular filter element to said base plate and upon the event of fire said material that will expand when exposed to heat and will harden will be activated and expand to continue to seal said tubular filter element to said base plate in the event of hot air or fire.

6. An emergency sacrificial sealing apparatus that seals and will continue to seal in the event of hot air or fire, comprising:

a filter and a base;

said filter including a tubular filter element having an internal passage, a closed top, and an open bottom;

said base including a base plate and a hole in said base plate wherein said tubular filter element is positioned over said base plate and directly connected to said base plate with said open bottom of said tubular filter element positioned over said hole in said base plate;

a first sealing material between the filter and said base plate; and a second sealing material between the filter and said base plate and proximate said first sealing material, wherein said first sealing material and said second sealing material are positioned relative to each other and relative to said tubular filter element and said base plate to seal said tubular filter element to said base plate and upon the event of hot air or fire, said second sealing material will be activated and expand to continue to seal said tubular filter element to said base plate in the event of hot air or fire;

wherein said second sealing material is a material containing an initiator positioned between said tubular filter element and said base plate and proximate said first sealing material, wherein said material containing an initiator and said first sealing material are positioned relative to each other and relative to said tubular filter element and said base plate to seal said tubular filter element to said base plate and upon the event of hot air or fire said material containing an initiator will be activated and expand to continue to seal said tubular filter element to said base plate in the event of hot air or fire.

\* \* \* \* \*